Figure 3:
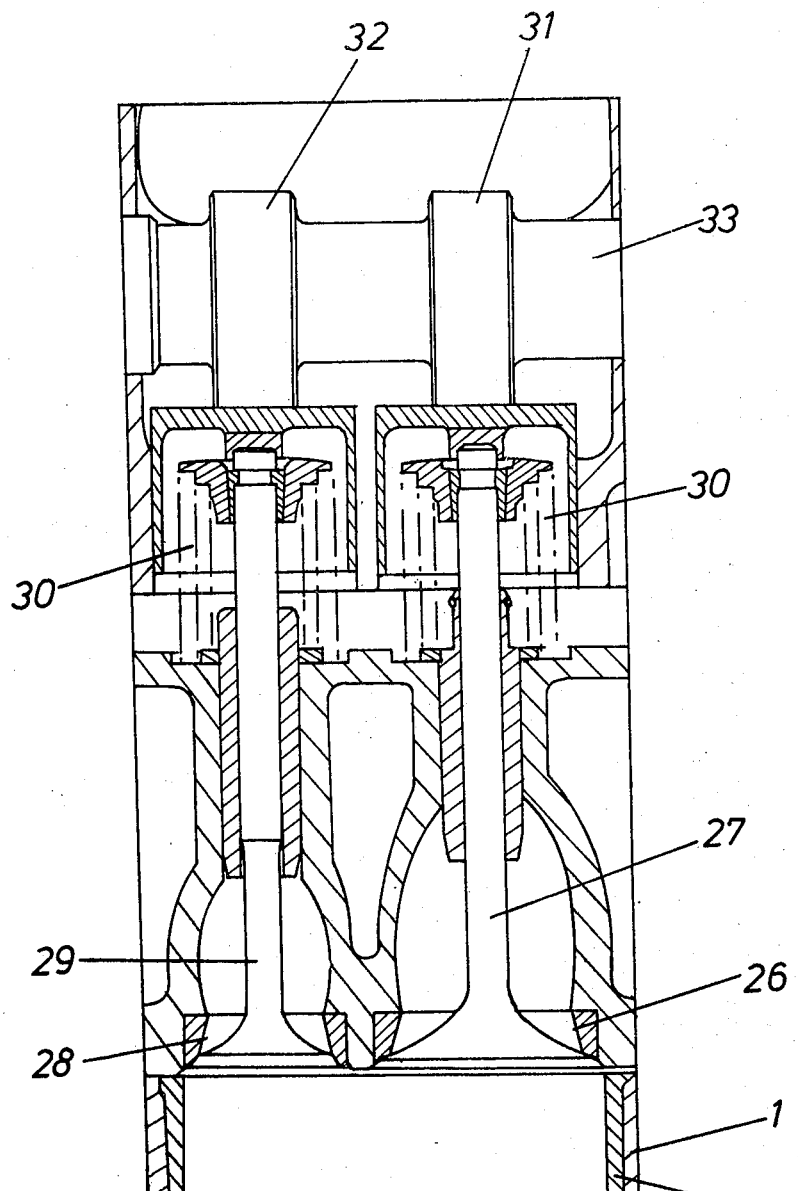

United States Patent [19]

Goodacre

[11] 3,970,053

[45] July 20, 1976

[54] INTERNAL COMBUSTION ENGINES
[75] Inventor: Charles Lindsay Goodacre, London, England
[73] Assignee: Fiat Societa per Azioni, Turin, Italy
[22] Filed: Oct. 25, 1974
[21] Appl. No.: 518,118

[30] Foreign Application Priority Data
Nov. 5, 1973 United Kingdom............ 51181/73
May 2, 1974 United Kingdom............ 19347/74

[52] U.S. Cl. ............................ 123/30 D; 123/32 K; 123/32 SP; 123/143 B; 123/169 EA; 123/191 S; 313/125
[51] Int. Cl.² .......................................... F02B 3/02
[58] Field of Search ............. 123/32 C, 32 D, 32 K, 123/32 L, 32 SP, 33 D, 143 R, 143 B, 148 A, 169 PA, 169 PH, 169 EL, 169 EA, 191 S, 191 SP, 30 C, 30 D; 313/122, 125, 141, 143

[56] References Cited
UNITED STATES PATENTS

| 1,320,115 | 10/1919 | Bloomhuff et al. .................. 313/143 |
| 1,596,240 | 8/1926 | Dikeman.......................... 313/125 X |
| 1,963,801 | 6/1934 | O'Marra ....................... 123/169 EL |
| 2,153,598 | 4/1939 | Steward..................... 123/143 B X |
| 2,821,177 | 1/1958 | Holt ................................. 123/32 K |
| 2,878,299 | 3/1959 | Starr........................... 123/32 SP X |
| 3,651,638 | 3/1972 | Goodacre ........................... 60/39.6 |
| 3,710,772 | 1/1973 | Warner....................... 123/169 P X |

FOREIGN PATENTS OR APPLICATIONS

| 35,069 | 12/1929 | France............................. 123/30 D |
| 1,046,057 | 12/1953 | France............................. 123/32 K |
| 534,424 | 3/1941 | United Kingdom.............. 123/30 D |

Primary Examiner—Charles J. Myhre
Assistant Examiner—Tony Argenbright
Attorney, Agent, or Firm—Sughrue, Rothwell, Mion, Zinn & Macpeak

[57] ABSTRACT

An internal combustion engine having at least one cylinder, a combustion chamber externally of the cylinder and communicating with the cylinder, and spark ignition means, which preferably comprises a first electrode supported in a central region of the combustion chamber and a spark plug having a single electrode extending into the combustion chamber and defining with the first electrode a spark gap, for initiating from said central region of the combustion chamber combustion of a fuel/air mixture in the combustion chamber.

21 Claims, 10 Drawing Figures

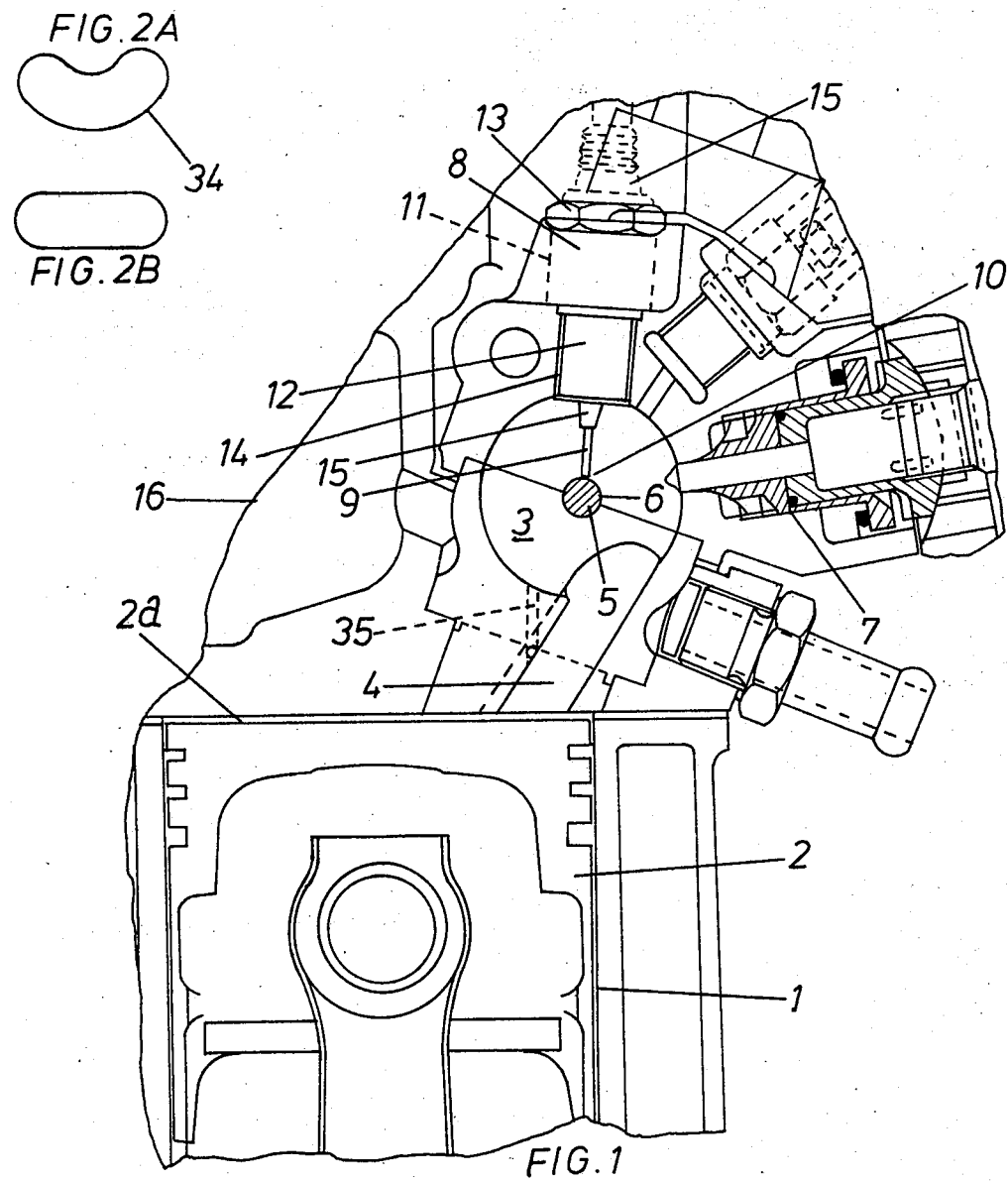

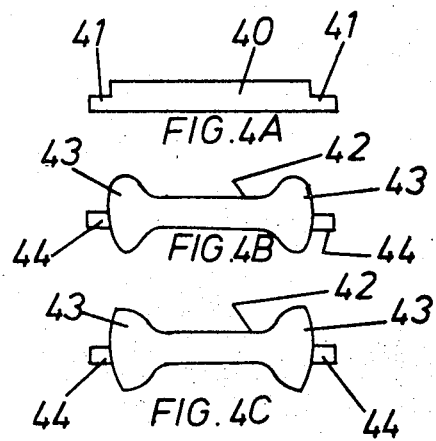
FIG.4A
FIG.4B
FIG.4C
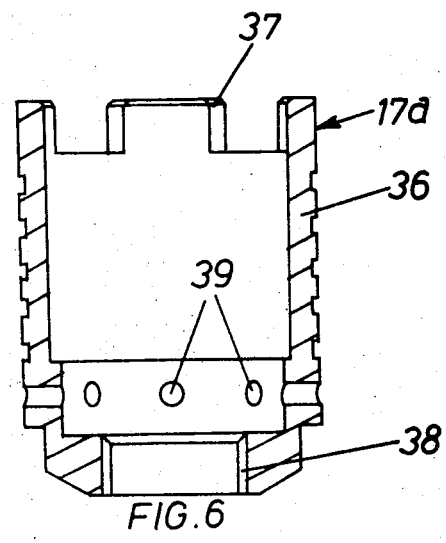
FIG.6
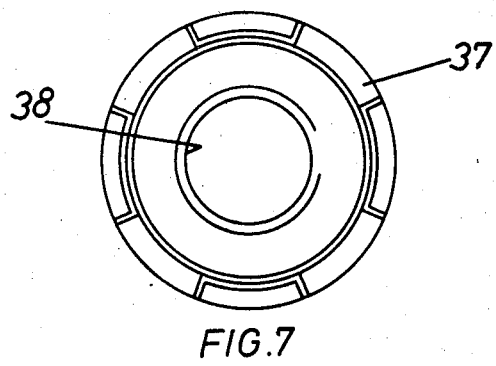
FIG.7

INTERNAL COMBUSTION ENGINES

This invention relates to internal combustion engines of the spark ignition type.

The invention is particularly concerned with Otto-cycle internal combustion engines of the kind comprising at least one cylinder, a combustion chamber externally of the cylinder and spark ignition means for igniting a fuel/air mixture in the combustion chamber. Such an engine is described and claimed in U.S. Pat. No. 3,651,638 assigned to Fiat. S.p.A.

The present invention provides an internal combustion engine comprising at least one cylinder, a combustion chamber externally of the cylinder and communicating with the cylinder, and spark ignition means for initiating from a central region of the combustion chamber combustion of a fuel/air mixture in the combustion chamber.

The spark ignition means preferably comprises a first electrode supported in said central region of the combustion chamber and a spark plug having a single electrode extending into the combustion chamber and defining with said first electrode a spark gap.

Preferably the combustion chamber is a spherical or substantially spherical combustion chamber, although it can be of any other suitable form such as ovoid or rhombohedral.

The single electrode of the spark plug may extend radially of the combustion chamber (where the combustion chamber is spherical or substantially so) and may terminate just short of the first electrode so that the spark gap is defined between said first electrode and an end face of the single electrode of the spark plug. Alternatively the single electrode of the spark plug may extend to one side of the first electrode so that the spark gap is defined between a side face of the single electrode and the first electrode. According to yet another alternative the first electrode has an aperture therein into which the single electrode of the spark plug extends so that the spark gap is defined between the single electrode and the wall of the aperture.

The combustion chamber may be connected to the cylinder by transfer passage means. The transfer passage means may be a single straight-sided passage which extends tangentially of the combustion chamber although it can, if desired, comprise two or more passages. According to a preferred embodiment the transfer passage means comprises a single slot-like passage which is preferably of arcuate form. The arrangement is preferably such that, substantially at the moment that ignition occurs, the transfer passage means will be substantially closed by the piston in said cylinder so that combustion takes place substantially completely outside the cylinder within the combustion chamber.

Fuel injector means may be provided for injecting fuel into the combustion chamber.

Means may be located within the combustion chamber providing a surface onto which fuel can be injected. Preferably the surface providing means comprises said first electrode. Thus the first electrode may comprise a ball, sphere or other suitably shaped element of electrically conductive material which provides said surface and which is supported within the combustion chamber by one or more spider arms which electrically connect the element to the wall of the combustion chamber. Alternatively the first electrode may comprise a bar member, which may have an enlargement medially thereof providing said surface, which is of electrically conductive material and which extends diametrically of the combustion chamber. The surface providing means may occupy from 1 to 50 percent, preferably 3 to 25 percent, of the volume of the combustion chamber.

The cylinder may be provided with a valve-controlled inlet port whereby air can be admitted into the cylinder for compression by the piston and a valve-controlled outlet port whereby products of combustion can be exhausted from the engine.

The combustion chamber and transfer passage means are preferably formed in the cylinder head of the engine.

As is usual with spark ignition engines, the size of the spark gap needs to be set within fairly closely defined limits. Since, in the engine of the present invention, the spark gap is not defined until the spark plug is in position in the engine, the spark gap cannot be set in conventional manner using a feeler gauge. The spark gap can, if desired, be set by making careful measurements and then cutting the single electrode (which has been made oversize) of the spark plug accurately to length so that when the spark plug is screwed fully into position in the engine the required spark gap will be defined. This is, however, a tedious and time consuming operation which is not suited to mass-production techniques, e.g., of automobile engines. Accordingly it is preferred that the spark plug make screw-threaded engagement with a port in the peripheral wall of the combustion chamber and that a lock nut be provided on the spark plug which can be tightened against a surface surrounding said port to lock the spark plug in an adjusted position. With such an arrangement the spark plug can be screwed into said port until the single electrode of the spark plug is in engagement with said first electrode, whereafter the spark plug can be partially unscrewed by a predetermined amount to set the required spark gap and the lock nut tightened to retain the spark plug in its adjusted position. The amount by which the spark plug is partially unscrewed will, of course, depend upon the size and pitch of the cooperating screw thread of the spark plug and port, but once this has been determined the spark gap can be readily and accurately set at any time both during initial manufacture of the engine and during subsequent servicing of the engine in the manner described.

The present invention also provides a method of setting the spark gap in an engine comprising at least one cylinder, a combustion chamber externally of the cylinder and communicating with the cylinder, and spark ignition means comprising a first electrode supported in a central region of the combustion chamber and a spark plug having a single electrode extending into the combustion chamber and defining with said first electrode a spark gap, the method comprising threading a lock nut onto the spark plug, screwing the spark plug into a threaded port in the combustion chamber until the single electrode of the spark plug is in engagement with said first electrode, partially unscrewing the spark plug by a predetermined amount to set the required spark gap, and tightening the lock nut against a surface surrounding said port so as to lock the spark plug in its adjusted position.

The said surface surrounding said port against which the lock nut is tightened may be a planar surface normal to the axis of said port and the lock nut may have a corresponding planar surface adapted to cooperate therewith. Preferably, however, said surface surrounding the port is a frusto-conical surface which tapers inwardly towards the port and the lock nut has a corresponding frusto-conical surface adapted to cooperate therewith.

The present invention also provides a spark plug comprising a single electrode only for use in an internal combustion engine according to the present invention. Such a spark plug may comprise a lock nut whereby it can be used in the method of the present invention.

The spark plug may be screwed into said port and the spark gap adjusted as aforesaid using a specially constructed composite spanner which forms yet a further feature of the present invention. This composite spanner comprises inner and outer members which are relatively rotatable, the inner member being adapted to engage the spark plug and the outer member being adapted to engage the lock nut. With such a composite spanner the spark plug can be screwed into said port and adjusted using the inner member and the lock nut then tightened against said surface surrounding the port using the outer member. The inner member may be an elongate member having a hexagonal socket at one end thereof adapted to engage the nut conventionally provided on the spark plug and having means such as a tommy bar at the other end thereof whereby the inner member can be manually rotated. The outer member may surround the inner member and comprise a tubular member one end of which is adapted to engage the lock nut and which may be provided at or adjacent its other end with means such as a radially extending bar whereby the outer member can be manually rotated. The lock nut may have a hexagonal outer peripheral surface and the said one end of the tubular member may comprise a hexagonal socket adapted to engage the hexagonal outer peripheral surface of the lock nut. Alternatively the lock nut and said one end of the tubular member may have cooperating projections and recesses.

The invention will be more particularly described with reference to the accompanying drawings, in which:

FIG. 1 is a sectional elevation of the relevant parts of one embodiment of an Otto-cycle internal combustion engine according to the present invention, FIGS. 2A and 2B are cross-sectional views of the transfer passage of the engine of FIG. 1.

Figure 5:
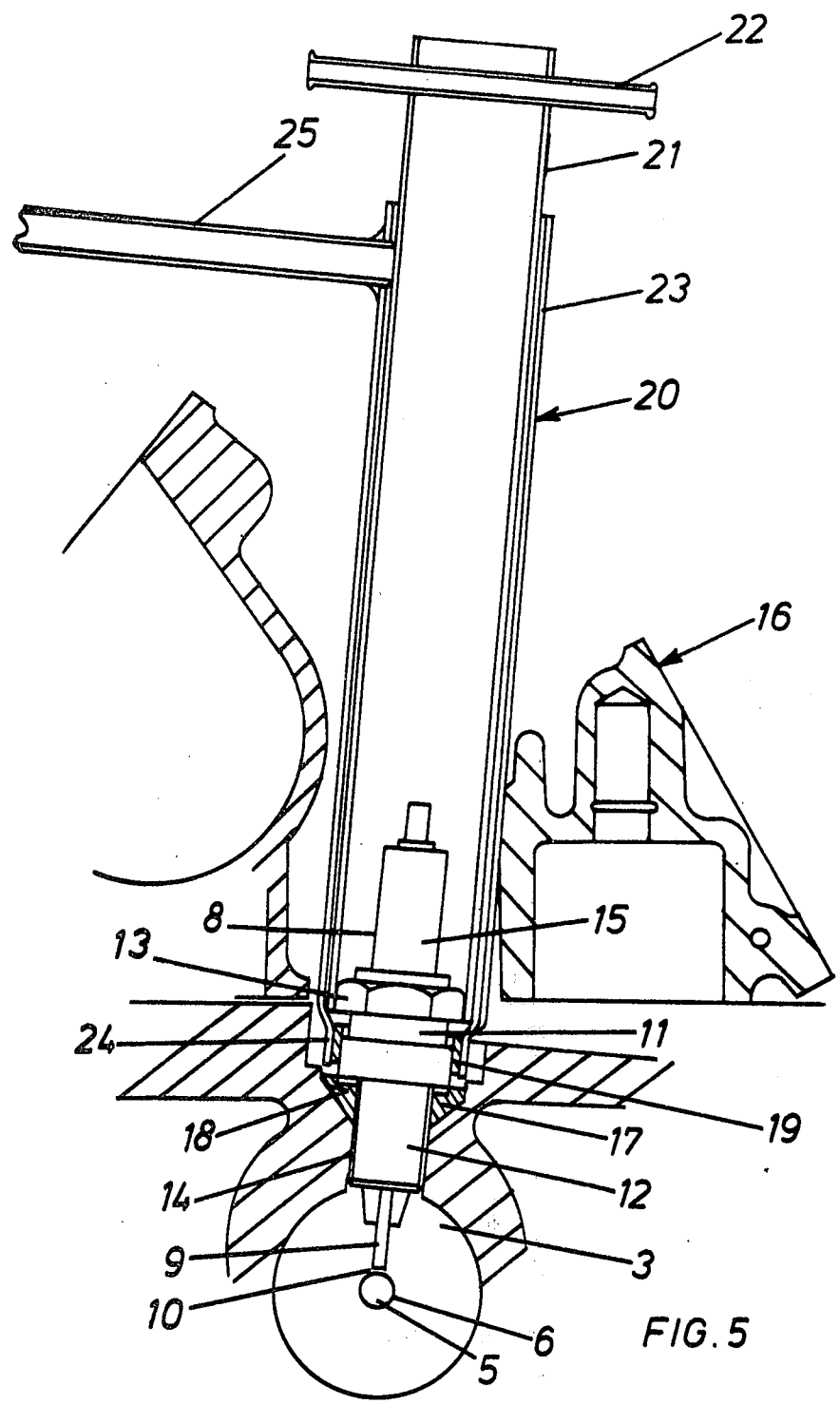

FIG. 3 is a fragmentary sectional elevation of the engine of FIG. 1 showing the arrangement of the valve-controlled inlet and exhaust ports, FIGS. 4A, 4B and 4C are views of different forms of first electrode for use in the engine of FIG. 1., FIG. 5 is a fragmentary sectional elevation illustrating the manner in which the spark gap is adjusted in an engine according to FIG. 1, and FIGS. 6 and 7 are sectional and plan views respectively of an alternative form of lock nut for use in the adjustment of the spark gap.

Referring to FIG. 1 of the drawings it will be seen that the engine comprises a cylinder 1 having a piston 2 reciprocatable therein. A spherical combustion chamber 3 is mounted externally of the cylinder 1 and is connected to the cylinder 1 by a transfer passage 4. Mounted centrally of the spherical combustion chamber 3 is an element 5 providing a surface 6 onto which fuel can be injected. The element 5 is of electrically conductive material and comprises the first electrode of spark ignition means to be described. The combustion chamber 3 and the transfer passage 4 are formed in the cylinder head 16 of the engine.

As will be seen from FIG. 3 the cylinder 1 has an air inlet port 26 normally closed by a poppet valve 27 and an exhaust port 28 normally closed by a poppet valve 29. The poppet valves 27 and 29 are biased towards closed position by valve springs 30 and are opened in properly timed sequence in accordance with the Otto four-stroke cycle by cams 31 and 32 respectively on a camshaft 33 driven by the crankshaft (not shown) of the engine.

A fuel injector 7 is provided for injecting fuel into the combustion chamber 3 for mixing with air compressed in the cylinder 1 by piston 2 and transferred to the combustion chamber 3 by way of transfer passage 4. As will be seen from FIG. 1, the transfer passage 4 extends tangentially of the combustion chamber 3 so that "swirl" is imparted to the air transferred to the combustion chamber 3 to ensure intimate mixing of the fuel and air. Preferably the fuel injector 7 is a dual injector which injects two streams of fuel into the combustion chamber although it could, if desired, be of any other suitable king, e.g., could be adapted to inject three or more streams of fuel. Fuel injector 7 is arranged to inject the fuel under pressure and in the form of a fine spray onto the surface 6 of the element 5 so that the fine spray of fuel is broken up by contact with the element 5 and can form a homogenous fuel/air mixture with air compressed in the cylinder 1 and transferred to the combustion chamber by way of transfer passage 4.

The transfer passage 4 is preferably a single straight-sided passage which, in cross-section, is in the form of an arcuate slot as shown in FIG. 2A. The outer arcuate wall 34 of this slot preferably has a radius equal to half the diameter of the combustion chamber 3. Alternatively the transfer passage 4 may be a single straight-sided passage which, in cross-section, is in the form of a straight slot as shown in FIG. 2B, although the engine is noisier in operation than when provided with the arcuate slot-like passage of FIG. 2A. The transfer passage may, if desired, be of other cross-sectional forms, e.g., may be a circular passage, or may comprise a plurality, e.g., seven, of smaller passages. Whether the transfer passage comprises a single passage or a plurality of smaller passages, the effective cross-sectional area thereof is preferably in the region of 4% to 8% of the area of the top of the piston 2. The length of the transfer passage may be from 10% to 100%, preferably 40% to 70%, of the diameter of the combustion chamber 3. If desired a secondary transfer passage 35 may be provided which extends between the combustion chamber 3 and the transfer passage 4, this secondary transfer passage 35 extending substantially parallel with the axis of the cylinder 1 and preferably being circular with a cross-sectional area of from 2% to 10% of the cross-sectional area of the transfer passage 4. The provision of such a secondary transfer passage has been found to reduce engine noise when the engine is operating at low rotational speeds, i.e., rotational speeds of up to about 40% of the maximum rotational speed of the engine.

A spark plug 8 is provided in the combustion chamber 3 for initiating combustion in accordance with the Otto cycle. The spark plug 8 comprises a single electrode 9 which cooperates with the element 5 to define a spark gap 10. In the illustrated embodiment the electrode 9 extends radially of the combustion chamber 3 and the spark gap 10 is defined between an end face of the electrode 9 and the surface 6 of the element 5. It will be understood, however, that if desired the electrode 9 could extend to one side of the element 5 so that the spark gap is defined between a side face of the electrode 9 and the surface 6 or that the electrode 9 could intrude into an aperture in the element 5 so that the spark gap is defined between the electrode 9 and the wall of the aperture. The spark plug 8, in addition to the electrode 9, comprises in conventional manner a metal body portion 11, having a threaded barrel portion 12 and a nut portion 13 which can be engaged by a suitable spanner to facilitate screwing the threaded barrel portion 12 into a suitably threaded bore 14, and a ceramic insulator 15 supporting the electrode 9 within the body portion 11.

Referring now to FIG. 5 it will be seen that to facilitate setting the spark gap 10, the spark plug 8 has threaded onto the barrel portion 12 thereof a lock nut 17 having a frusto-conical surface at one end adapted to engage a frusto-conical surface 18 surrounding the threaded port 14. The other end of the lock nut 17 comprises a nut portion 19 having an hexagonal external surface engageable by a suitable spanner. Thus, to set the spark gap 10, the spark plug can be screwed into the port 14 until the single electrode 9 engages the surface 6 of the element 5, the spark plug then unscrewed by a predetermined amount to obtain the required spark gap 10, and the lock nut 17 then tightened against the surface 18 surrounding the port 14 to lock the spark plug in adjusted position. These operations can be effected using a composite spanner 20 which comprises an inner member 21 one end of which defines a hexagonal socket adapted to engage the nut portion 13 of the spark plug and the other end of which is provided with a tommy bar 22 whereby the inner member can be manually rotated and an outer member 23 concentric with the inner member 21 one end of which defines an hexagonal socket 24 adapted to engage the nut portion 18 of the lock nut 17 and the other end of which comprises a radially-extending bar 25 whereby the outer member 23 can be rotated. Thus the spark plug 8 can be screwed into the port 14 using the inner member 21 of the composite spanner 20 until the single electrode 9 is in engagement with the element 5 and then partially unscrewed by a predetermined amount, and the inner member 21 of the spanner 20 then held against rotation whilst the lock nut 17 is tightened against the surface 18 using the outer member 23 of the spanner 20. An alternative form of lock nut 17 is shown in FIGS. 6 and 7. As will be seen this alternative lock nut 17a, which is particularly suitable for an air-cooled engine, comprises a cylindrical body portion 36 one end of which is castellated as shown at 37 and the other end of which comprises a threaded bore 38 adapted to make screw-threaded engagement with the threaded barrel portion 12 of a spark plug 8 as described. The body portion 36 is adapted to surround a spark plug 8 with sufficient clearance to enable the inner member 21 of a composite spanner similar to the spanner 20 to engage the nut portion 13 of the spark plug. For use with the lock nut 17a, the said one end of the outer member 23 of the composite spanner 20 is castellated and is adapted to engage the castellations 37 of the lock nut 17a. Apertures 39 may be provided in the lock nut 17a so as to provide for the free circulation of air between the lock nut and the spark plug.

The element 5 providing the surface 6 on which fuel is injected and forming one electrode of the spark ignition means preferably comprises a bar which extends diametrically of the combustion chamber 3. This bar may be a plain cylindrical bar 40 as shown in FIG. 4A having a spigot 41 at each end, the spigots being received in apertures in the wall of the combustion chamber. Preferably, however, the bar is as shown in FIG. 4B or FIG. 4C and comprises a cylindrical central portion 42 and enlarged end portions 43 from which extend spigots 44 which are received in apertures in the wall of the combustion chamber. The provision of the bar with enlarged end portions 43 has been found to be beneficial in reducing undesired exhaust emissions from the engine. The bar occupies from 3% to 25%, preferably 3% to 5%, of the volume of the chamber 3. The single electrode 9 of the spark plug 9 preferably cooperates with the center of the bar to define the spark gap 10 so that ignition of a fuel/air mixture in the combustion chamber 3 is initiated from as close to the center of the combustion chamber 3 as is possible.

The piston 2 has a planar crown 2a and is adapted, when at top dead center, to close the transfer passage 4 so that combustion takes place substantially completely within the combustion chamber 3. To this end the spacing between the crown of the piston and the cylinder head 16 when the cylinder is at top dead center is kept to a minimum and does not exceed 2.0 mm. Preferably the spacing between the crown of the piston and the cylinder head 16 when the piston is at top dead center is from 0.7 to 1.0 mm.

It has been found that by initiating combustion from near the center of the combustion chamber 3, more complete combustion is obtained resulting in a reduction in undesirable exhaust emissions from the engine. Further, since the free end of the electrode 9 and the element 5 are located near the center of the combustion chamber in a region of relatively low turbulence, there is little or no tendency for the spark gap 10 to grow. Moreover, since that part of the ceramic insulator 15 which projects into the combustion chamber 3 and that part of the electrode 9 adjacent the ceramic insulator are located in a region of relatively high turbulence, the plug tends to stay clean with little or no build-up of deposits thereon. Tests on an engine of the kind illustrated have also shown that such an engine is capable of running on a wide range of distilled hydrocarbon fuels and, over a large portion of its rotational speed range, at very lean fuel/air ratios, so that the engine can be operated on low quality hydrocarbon fuels with low fuel consumption and with a reduction in undesirable exhaust emissions as compared with a conventional Otto-cycle engine wherein combustion takes place in the engine cylinder.

The engine may be provided with suitable supercharging means. Such supercharging means may conveniently comprise a turbocharger driven by energy derived from the exhaust gases emitted by the engine and adapted to supply air to, e.g., an inlet manifold of the engine.

What is claimed is:

1. A internal combustion engine comprising at least one cylinder, a piston reciprocable in the cylinder, means for admitting air into said cylinder for compression by the piston, a substantially spherical combustion chamber externally of the cylinder, transfer passage means communicating the combustion chamber with the cylinder and through which air compressed by the piston can pass into the combustion chamber, fuel injector means for injecting fuel into the combustion chamber, and spark ignition means for igniting a fuel-/air mixture in the combustion chamber, the spark ignition means comprising a first electrode extending diametrically of the combustion chamber and a second electrode which extends into the combustion chamber and defines with said first electrode a spark gap located in a central region of the combustion chamber, said transfer passage means extending tangentially of the combustion chamber in a plane perpendicular to said first electrode whereby air compressed by the piston and transferred to the combustion chamber will be caused to rotate within the combustion chamber about the axis provided by said first electrode.

2. An internal combustion engine according to claim 1, wherein the spark ignition means comprises a spark plug having a single electrode extending into the combustion chamber and providing said second electrode.

3. An internal combustion engine according to claim 2, wherein the single electrode of the spark plug extends radially of the combustion chamber.

4. An internal combustion engine according to claim 2, wherein the single electrode of the spark plug terminates short of the first electrode so that the spark gap is defined between said first electrode and an end face of the single electrode of the spark plug.

5. An internal combustion engine according to claim 2, wherein the first electrode has an aperture therein and the single electrode of the spark plug extends into said aperture so that the spark gap is defined between the single electrode of the spark plug and the wall of the aperture.

6. An internal combustion engine according to claim 2, wherein the single electrode of the spark plug extends to one side of the first electrode so that the spark gap is defined between a side face of the single electrode and the first electrode.

7. An internal combustion engine according to claim 1, wherein the transfer passage means comprises a single straight-sided passage.

8. An internal combustion engine according to claim 1, wherein the transfer passage is slot-like in cross-section.

9. An internal combustion engine according to claim 1, wherein the transfer passage is, in cross-section, in the form of an arcuate slot.

10. An internal combustion engine according to claim 1, wherein the arrangement is such that, substantially at the moment that ignition occurs, the transfer passage means will be substantially closed by the piston so that combustion takes place substantially completely outside the cylinder within the combustion chamber.

11. An internal combustion engine according to claim 1, wherein means is located within the combustion chamber providing a surface onto which fuel can be injected.

12. An internal combustion engine according to claim 11, wherein said surface providing means comprises said first electrode.

13. An internal combustion engine according to claim 11, wherein the first electrode comprises an element of electrically conductive material which provides said surface and which is supported within the combustion chamber by one or more spider arms which electrically connect the element to the wall of the combustion chamber.

14. An internal combustion engine according to claim 11, wherein said surface providing means is spherical.

15. An internal combustion engine according to claim 11, wherein said surface providing means comprises a bar which extends diametrically of the combustion chamber.

16. An internal combustion engine according to claim 11, wherein said surface providing means comprises a bar extending diametrically of the combustion chamber and having enlarged end portions.

17. An internal combustion engine according to claim 1, wherein the cylinder is provided with a valve-controlled inlet port whereby air can be admitted into the cylinder for compression by the piston and a valve-controlled outlet port whereby products of combustion can be exhausted from the engine.

18. An internal combustion engine according to claim 1, wherein the combustion chamber is formed in a cylinder head of the engine.

19. An internal combustion engine according to claim 18, wherein the transfer passage means is formed in the cylinder head of the engine.

20. An internal combustion engine according to claim 2, wherein the spark plug makes screw-threaded engagement with a port in the peripheral wall of the combustion chamber and wherein a lock nut is provided on the spark plug which can be tightened against a surface surrounding said port to lock the spark plug in an adjusted position.

21. An internal combustion engine according to claim 20, wherein said surface surrounding the port is a frusto-conical surface which tapers inwardly towards the port and the lock nut has a corresponding frusto-conical surface adapted to cooperate therewith.

* * * * *